(12) United States Patent
Bejin et al.

(10) Patent No.: US 7,017,980 B1
(45) Date of Patent: Mar. 28, 2006

(54) VEHICLE LOAD FLOOR

(75) Inventors: Peter Bejin, Farmington Hills, MI (US); Jennifer Bremmer, Clawson, MI (US); Mike Whitens, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/223,500

(22) Filed: Sep. 9, 2005

Related U.S. Application Data

(62) Division of application No. 10/904,989, filed on Dec. 8, 2004, now Pat. No. 6,945,594.

(51) Int. Cl.
*B60N 3/12* (2006.01)

(52) U.S. Cl. .............. 296/193.07; 296/37.14
(58) Field of Classification Search ........... 296/193.07, 296/37.14, 37.3
See application file for complete search history.

(56) References Cited

U.S. PATENT DOCUMENTS

| | | | | |
|---|---|---|---|---|
| 4,423,900 A | * | 1/1984 | Sugimoto et al. | 296/37.14 |
| 5,860,687 A | * | 1/1999 | Corporon et al. | 296/37.2 |
| 5,979,962 A | * | 11/1999 | Valentin et al. | 296/37.1 |
| 6,033,003 A | * | 3/2000 | Bell et al. | 296/37.3 |
| 6,247,741 B1 | * | 6/2001 | Seel et al. | 296/37.14 |
| 6,290,277 B1 | * | 9/2001 | Spykerman et al. | 296/37.16 |
| 6,439,633 B1 | * | 8/2002 | Nemoto | 296/37.14 |
| 6,520,364 B1 | * | 2/2003 | Spykerman et al. | 220/6 |
| 6,644,709 B1 | * | 11/2003 | Inagaki et al. | 296/37.14 |
| 6,752,304 B1 | * | 6/2004 | Hotary et al. | 296/37.14 |
| 6,793,261 B1 | * | 9/2004 | McLeod et al. | 296/37.2 |
| 6,811,196 B1 | * | 11/2004 | Gammon | 296/37.16 |
| 6,874,667 B1 | * | 4/2005 | Dykstra et al. | 224/498 |
| 6,890,015 B1 | * | 5/2005 | Carlsson et al. | 296/37.14 |

* cited by examiner

*Primary Examiner*—Kiran B. Patel
(74) *Attorney, Agent, or Firm*—Gigette M. Bejin

(57) ABSTRACT

A load floor (14) for attachment to a rear portion (18) of a vehicle floorpan (20). The load floor (14) includes a one-piece body (42) that has a panel portion (44) with reinforcement members (84), support members (46', 46"), and containers (52) extending therefrom. The support members (46', 46") are configured for supporting the one-piece body (42) on the floorpan (20) and minimizing a load span (32–36) across said panel portion (44). Also, the reinforcement members (84) are utilized for sufficiently reinforcing the panel portion (44).

10 Claims, 5 Drawing Sheets

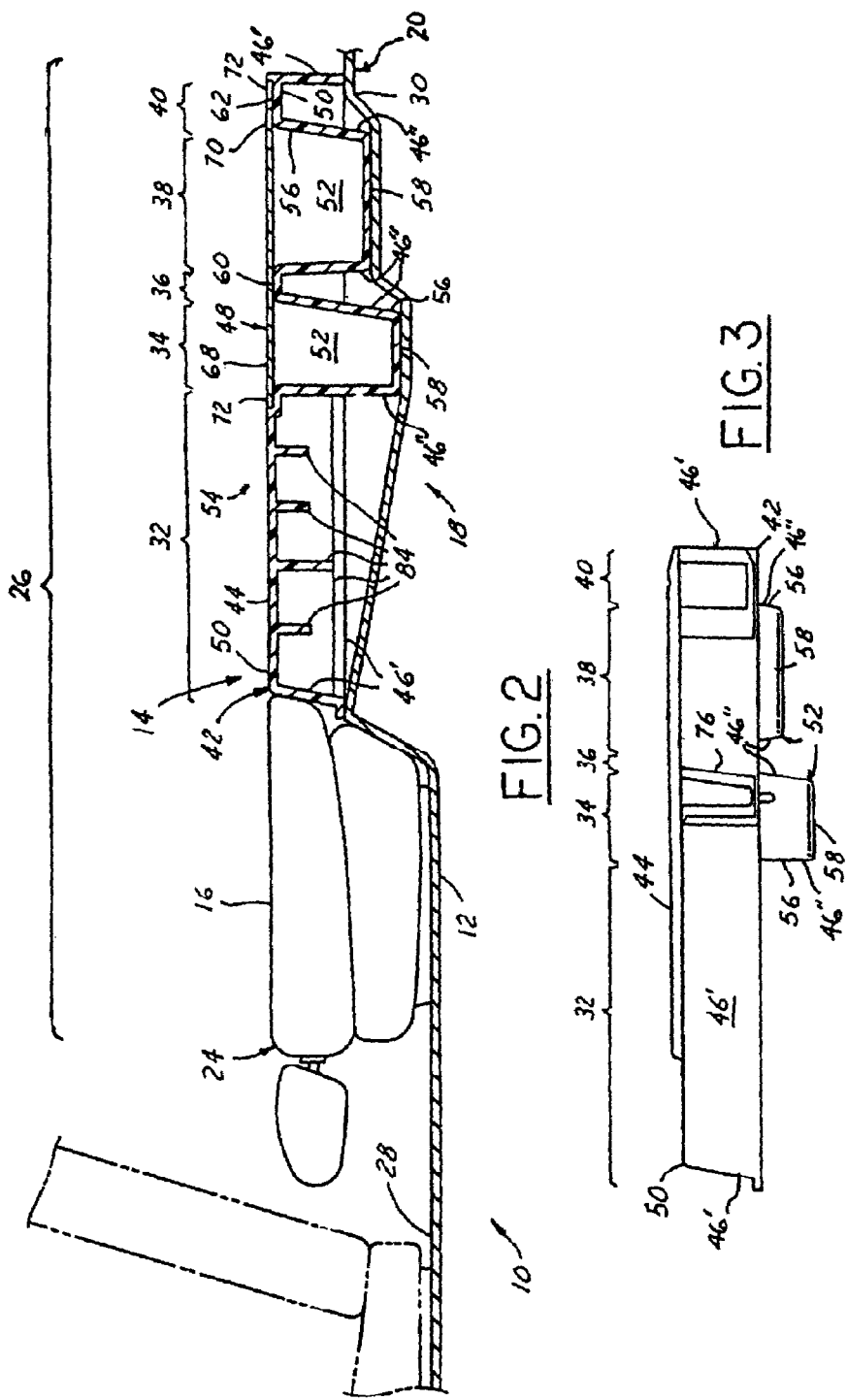

VEHICLE LOAD FLOOR

CROSS-REFERENCE TO RELATED APPLICATIONS

This continuing application is a divisional application of U.S. application Ser. No. 10/904,989, filed Dec. 8, 2004 now U.S. Pat. No. 6,945,594, entitled "VEHICLE LOAD FLOOR," which is incorporated by reference herein.

TECHNICAL FIELD

The present invention relates generally to vehicles, and more particularly to a load floor having a lightweight robust construction for supporting a substantially high load within a vehicle.

BACKGROUND

Automotive manufacturers are well known for producing robust vehicles for carrying substantially high loads. For example, a typical small or mid-sized SUV can have a sufficiently strong load floor for supporting an approximately 200-pound load over about a 70-millimeter diameter disc, while deflecting less than about 10-millimieters.

One known load floor includes a recessed receptacle for storing a spare tire. This spare tire typically has a sufficiently strong construction for supporting a substantially high load placed across the load floor.

Another known load floor, as typically integrated within pick-up trucks, is comprised of sheet metal with the spare tire stored on the underside of the vehicle beneath the load floor. One skilled in the art will understand that the sheet metal typically is sufficiently strong for supporting the high cargo load.

It would be desirable to provide a vehicle load floor with a lightweight robust construction for supporting a substantial load, providing additional storage space, minimizing noise that can be generated between vehicle components, and decreasing manufacturing cycle time, as well as costs associated therewith.

SUMMARY OF THE INVENTION

One embodiment of the present invention is a vehicle load floor having a robust one-piece body for supporting a substantially high load. The one-piece body has a panel portion, one or more reinforcement members coupled to the panel portion, and one or more support members extending from the panel portion for supporting the load floor on the vehicle floorpan. The support members are configured for evenly supporting the one-piece body so as to provide two or more generally small load spans across the load floor.

One advantage of the present invention is that a load floor is provided that has a robust construction for supporting substantially heavy cargo within the vehicle.

Another advantage of the present invention is that a load floor is provided that has additional storage space within the vehicle for various items. e.g. a spare tire jack.

Yet another advantage of the present invention is that a load floor is provided that has a lightweight construction for enhancing fuel economy and overall vehicle performance.

Still another advantage of the present invention is that a load floor is provided that can be quickly installed within a vehicle so as to minimize the manufacturing cycle time and the costs associated therewith.

Yet another advantage of the present invention is that a load floor is provided that minimizes the noise that can be generated from between abutting interfaces of vehicle components.

Still another advantage of the present invention is that a load floor is provided that has a generally flat construction for carrying generally large-sized cargo and/or a substantial amount of smaller-sized cargo within the vehicle.

Other advantages of the present invention will become apparent upon considering the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of the examples of the invention:

FIG. 2 is a longitudinal cross-sectional view of the vehicle shown in FIG. 1A, as taken along line 2—2, illustrating the load floor having support members extending therefrom for distributing a load substantially across the load floor and minimizing load spans thereacross;

FIG. 3 is a side view of a one-piece body of the floor assembly shown in FIG. 1A;

DETAILED DESCRIPTION OF THE INVENTION

Figure 1A:
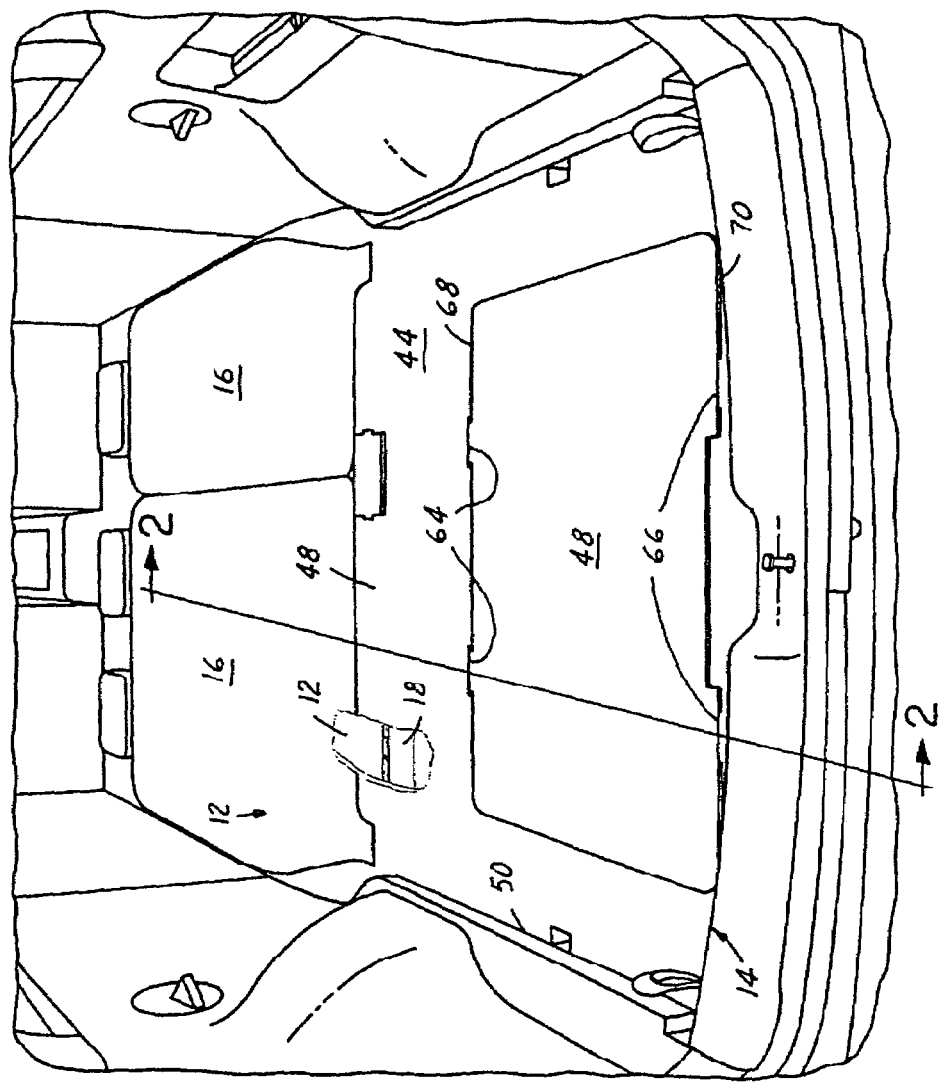
FIG. 1A is a rear perspective view of a vehicle having a second row of seats folded forward for providing a generally flat floor assembly with a load floor integrated therein, illustrating the load floor in a closed configuration, according to one advantageous embodiment of the claimed invention.

In the following figures, the same reference numerals are used to identify the same components in the various views.

The present invention is particularly suited for a vehicle load floor with a lightweight robust construction, which has two or more generally small load spans for supporting substantially high loads of cargo. In addition, this load floor preferably is integrated within a rear region of a vehicle and provides a generally flat floor-level surface from a forward-most seat location to a rearward-most location in a vehicle interior. In this way, the embodiments described herein employ structural features where the context permits.

However, various other embodiments are contemplated having different combinations of the described features, having additional features other than those described herein, or lacking one or more of those features. For instance, the load floor can instead be integrated within an intermediate region or a forward region of the vehicle as desired. By way of another example, the load floor can instead be installed within a passenger vehicle, which lacks a generally flat floor-level surface from the forward-most seat location to the rearward-most location of the vehicle interior. For these reasons, it is contemplated that the invention can be carried out in a variety of other modes and utilized for other suitable applications as desired.

Figure 1B:
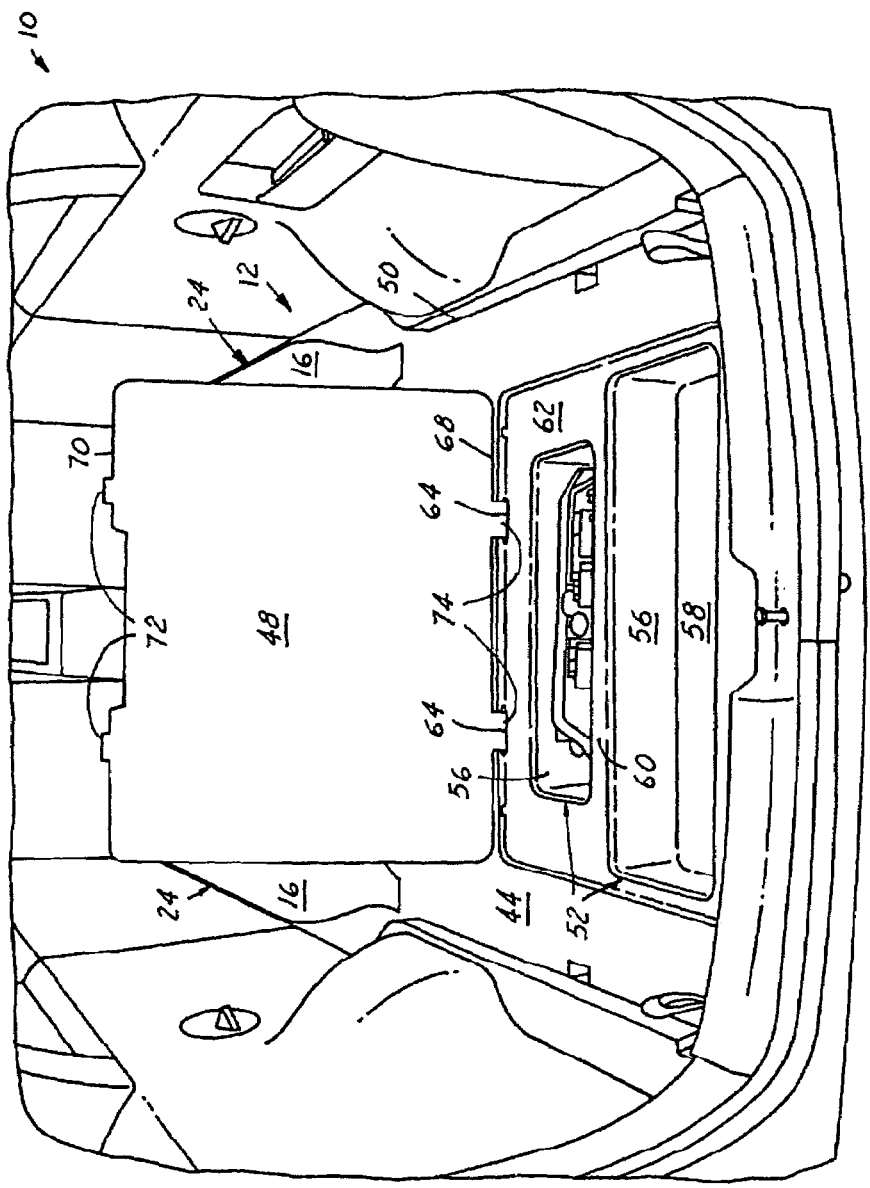
FIG. 1B is a rear perspective view of the vehicle shown in FIG. 1A, illustrating the load floor in an open configuration.

Referring now to FIGS. 1A and 1B, there are shown rear perspective views of a vehicle 10 having a floor assembly 12, according to one advantageous embodiment of the claimed invention. As detailed below, this floor assembly 12 is comprised of a load floor 14 and a back-seat surface 16 movable between an upright position (shown in FIG. 1A) and a folded position (shown in FIG. 1B). FIG. 1A shows the load floor 14 in a closed configuration while FIG. 1B shows the load floor 14 in an open configuration.

As best shown in FIG. 2, the load floor 14 is secured to a rear portion 18 of a floorpan 20 with the back-seat surface 16 being substantially aligned with the load floor 14. The back-seat surface 16 is the rear side of one or more second-row seats 24, which are folded forward for providing a generally flat surface 26 extending between forward-most seat location 28 and a rearward-most interior location 30. This feature is beneficial for carrying substantially large-sized cargo and/or a generally large amount of smaller-sized cargo within the vehicle 10. However, as introduced hereinabove, it is contemplated that the load floor 14 can instead be utilized for a variety of other suitable applications as desired.

As detailed below, the load floor 14 has a lightweight robust construction with two or more generally small load spans 32, 34, 36, 38, 40 for supporting substantially high loads of cargo.

With specific attention to FIG. 2, the load floor 14 includes a one-piece body 42 ("body") with a panel portion 44 and one or more support members 46', 46" extending therefrom for supporting the panel portion 44 on the floorpan 20 of the vehicle 10. These support members 46', 46" are configured for providing five generally small load spans 32, 34, 36, 38, 40. In this way, the panel portion 44 and a cover member 48, which is coupled to the panel portion 44, are sufficiently supported by the nearby support members 46', 46" so as to minimize the deflection of the panel portion 44 and the cover member 48.

In this embodiment, the support members include one continuous load-bearing external wall 46', which extends from a periphery 50 of the panel portion 44, and two load-bearing containers 46", which extend from an internal region 54 of the panel portion 44. In this regard, the external wall 46 and the containers 461' (hereinafter support members 46', 46") are sufficiently positioned for providing generally small load spans 32, 34, 36, 38, 40 respectively for the panel portion 44 and the cover member 48. In other words, the support members 46', 46" are positioned for distributing an applied load across the load floor 14.

It is contemplated that the panel portion 44 can merely have load-bearing pillar members or walls extending therefrom instead of the load-bearing containers 46".

One skilled in the art will appreciate that this construction is sufficiently strong for evenly supporting a substantially high load and minimizing deflection of the load floor 14. In fact, this efficient construction is sufficiently robust that the body 42 can be comprised of somewhat low-strength materials, e.g. thin and/or lightweight materials, and sufficiently support a high load. In a preferred embodiment, the body 22 is comprised of a high-strength plastic material.

Another advantage of this construction is that these support members 46', 46" provide substantially small interface surfaces for contacting the floorpan 20. This feature is beneficial for minimizing the squeaks and the other noises that can otherwise be produced by abutting interfaces between the vehicle components.

Each container 46" includes a cylindrical portion 56 that extends from the panel portion 44 and a bottom interface portion 58 extending from the cylindrical portion 56. In this embodiment, the cylindrical portion 56 is sized sufficiently long for contacting the bottom interface portion 58 with the floorpan 20. In that regard, the container 46" is a load-bearing structure for supporting the panel portion 44 of the body 42.

As described hereinabove, these containers 46" extend from an internal region 54 of the panel portion 44 for minimizing load spans 32, 34, 36, 38, 40 within the panel portion 44. For this reason, the load floor 14 can support substantially high loads with generally small deflection of the load floor 14.

It will be appreciated that the cylindrical portion 56 can extend from various regions of the panel portion 44 instead of the internal region 54. In addition, the cylindrical portion 56 can be sized for providing clearance between the bottom interface portion 58 and the floorpan 20. In other words, the containers 46" can be non-load-bearing structures as desired.

The containers 46" are beneficial for providing storage space 52 for a spare tire jack, a hybrid electrical vehicle battery, or various other suitable items as desired. In addition, it is understood that the panel portion 44 can have more or less than two containers 46" extending therefrom.

The cylindrical portion 56 has a generally rectangular cross-section. However, it is contemplated that the cylindrical portion 56 can have a variety of other suitable shapes.

The panel portion 44 also includes partition portions 60 extending between the containers 46" for supporting the cover member 48. These partition portions 60 decrease the load spans 34, 38 across the cover member 48. For that reason, the cover member 48 can support a substantially high load. Also, in this regard, the cover member 48 can have a somewhat low-strength construction, e.g. thin and/or lightweight material, that sufficiently supports a high load and resists deflection.

In this embodiment, the load spans 34, 38 are sized according to the openings of the containers 46". However, it will be appreciated that the body 42 can include additional recesses, protrusions or various other structures for sizing the load spans 34, 38 larger or smaller than the openings of the containers 46'.

Referring back to FIGS. 1B and 2, the body 42 has a recess 62 formed therein for receiving the cover member 48 and providing the generally flat surface 26 across the body 42 and cover member 48.

Furthermore, the body 42 includes two pairs of slots 64, 66 formed in opposing sides 68, 70 of the recess 62. These slots 64, 66 are utilized for receiving two pairs of tabs 72, 74 that extend from the cover member 48. In this way, the cover member 48 can be secured to the body 42.

It is contemplated that the cover member 48 can instead be coupled to the body 42 by way of various other suitable fasteners. For example, in another embodiment, the cover member 48 can be pivotally coupled to the body 42 via a conventional hinge member with a detent mechanism integrated within an opposing end of the cover member 48 so as to selectively secure the cover member 48 to the body 42 in the closed configuration.

Figure 5:
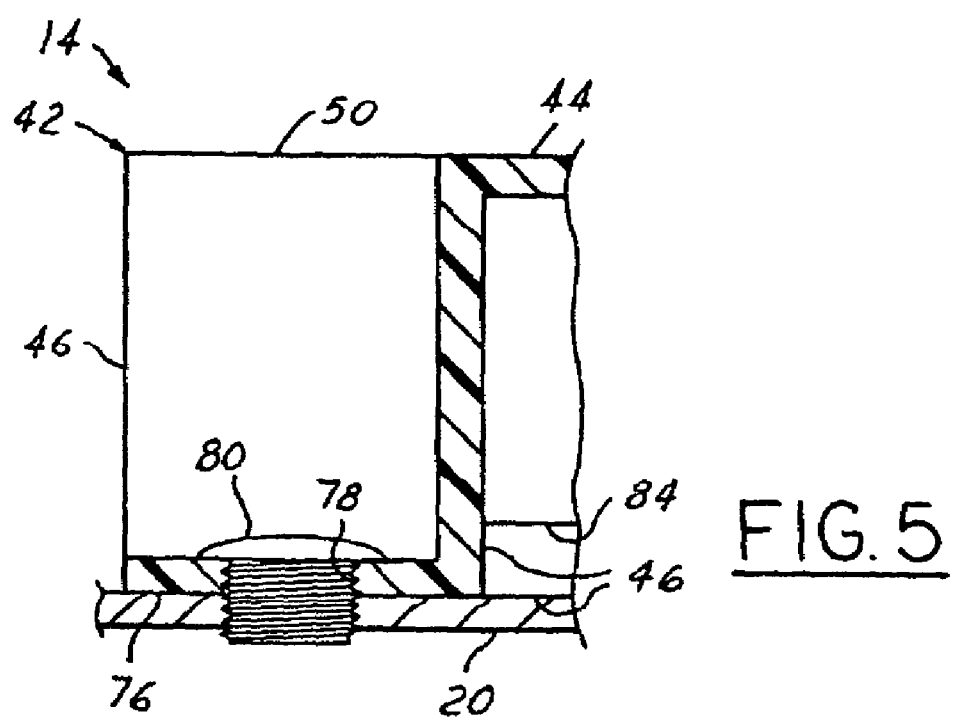
FIG. 5 is a cross-sectional view of the one-piece injection molded body shown in FIG. 4, as taken along line 5—5, illustrating the body having a support member with a footing portion for attachment to a vehicle floorpan.

Also in this embodiment, as shown in FIG. 5, one or more of the support members 46', 46" include a footing portion 76 with a hole 78 formed therein for receiving a fastener 80 and securing the body 42 to the floorpan 20. This fastener 80 is a threaded belt member. However, it is understood that the fastener 80 can instead be a heat stake, various other suitable fasteners, or any combination thereof as desired.

These footing portions 76 comprise integral fastening structures that are formed within the body 42 of the load floor 14. In this way, the footing portions 76 eliminate additional sub-assembly processes for attaching a grommet or other suitable fastener to the load floor 14. For that reason, the footing portions 76 are advantageous for decreasing the manufacturing cycle time and the costs associated therewith.

Figure 4:
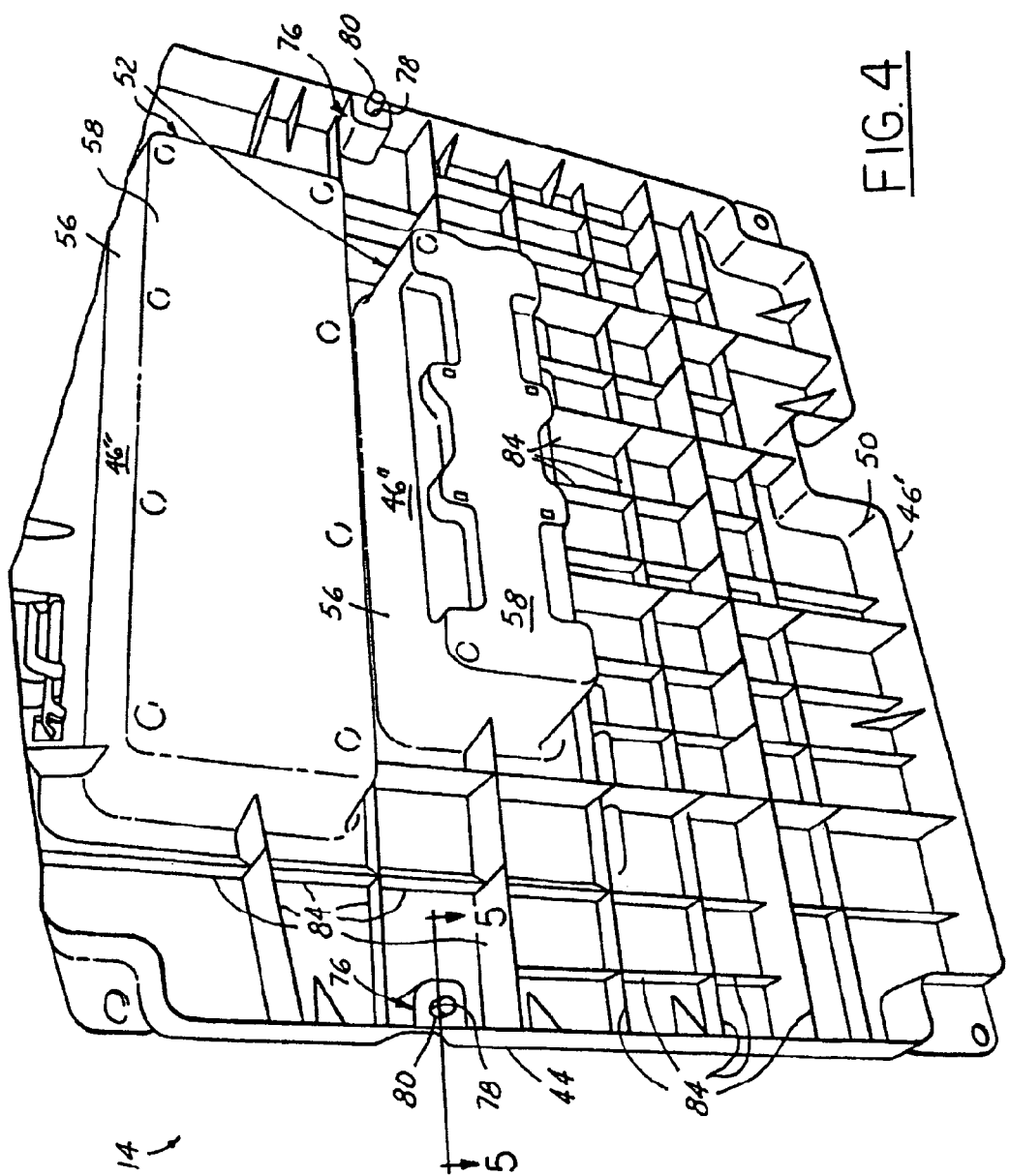
FIG. 4 is a perspective bottom view of the one-piece body shown in FIG. 3.

Referring back to FIGS. 2 and 4, the panel portion 44 has a series of reinforcement members 84 coupled thereto for strengthening the panel portion 44 and supporting a predetermined load applied to the panel portion 44. In this regard, the reinforcement members 84 also minimize the deflection of that panel portion 44. For example, the reinforcement members 84, in combination with the support members 46', 46", sufficiently strengthen the panel portion 44 for limiting deflection therein to about 10-millimeters when about a 200-pound load is applied to 70-millimeter diameter disc of the panel portion 44. However, it is understood that the panel portion 44 can be sufficiently strong for supporting various other loads and maintaining various other degrees of rigidity.

In this embodiment, the reinforcement members 84 comprise a framework of ribs extending orthogonally from the panel portion 44. This framework preferably is a one-piece structure and an integral part of the body 42. In addition, the ribs preferably are positioned substantially perpendicular to each other in this framework. One skilled in the art will appreciate that this construction is beneficial for substantially strengthening the panel portion 44 while minimizing the weight and/or number of reinforcement members 84.

Furthermore, these reinforcement members 84 are also sized and constructed for providing clearance from the floorpan 20. Specifically, in this embodiment, the ribs are sized smaller than the peripheral load-bearing wall 46 and the load-bearing containers 46". In this way, the ribs do not contact the floorpan 20 and therefore further decrease the risk of squeaking or other noise that can be produced between the abutting interfaces of vehicle components.

It is contemplated that the reinforcement members 84 can instead be wall structures, one or more additional panel layers mounted to the panel portion 44, or other suitable reinforcement members 84 as desired. Further, it is understood that the reinforcement members 84 can be positioned relative to each other and extend from the panel portion 44 by various suitable angles besides orthogonally and perpendicularly.

Additionally, the body 42 is comprised of a polypropylene material for further decreasing the risk of squeaking or other noise that can be produced by the movement between the abutting interfaces of vehicle components. However, it will be appreciated that the body 42 can instead be comprised of various other suitable materials.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

What is claimed is:

1. A load floor for attachment to a floorpan of a vehicle, comprising:
   a one-piece body having a panel portion with at least one reinforcement member, at least one support member, and at least one container extending therefrom:
   said at least one support member extending from said panel portion;
   said at least one support member supporting said one-piece body on the floorpan and minimizing a load span across said panel portion;
   said at least one support member comprising at least one load-bearing wall and said at least one container;
   a cover member selectively coupled to said one-piece body for covering said at least one container;
   said at least one reinforcement member reinforcing said panel portion for supporting a predetermined load and minimizing a deflection of said panel portion.

2. The load floor recited in claim 1 wherein said cover member is pivotally coupled to said one-piece body.

3. The load floor recited in claim 1 wherein said cover member has a substantially thin construction.

4. The load floor recited in claim 1 wherein said panel portion includes a recess for receiving said cover member.

5. The load floor recited in claim 1 wherein said at least one reinforcement member comprises at least one rib extending from said panel portion.

6. The load floor recited in claim 1 wherein said at least one container includes a cylindrical portion extending from said panel portion and an bottom interface portion extending from said cylindrical portion, said bottom interface portion for contacting the floorpan and supporting said one-piece body on the floorpan.

7. The load floor recited in claim 1 wherein said at least one container includes a cylindrical portion extending from said panel portion and an bottom interface portion extending from said cylindrical portion, said bottom interface portion for contacting the floorpan and supporting said one-piece injection-molded body on the floorpan.

8. The load floor recited in claim 1 wherein said panel portion has a plurality of container portions extending therefrom with a plurality of partition portions therebetween, said plurality of partition portions for supporting said cover member.

9. A floor assembly for a vehicle, comprising;
   a floorpan having an interior surface and an exterior surface;
   a primary floor coupled to said interior surface of said floorpan; and
   a load floor coupled to said interior surface of said floorpan and being substantially aligned with said primary floor;
   wherein said load floor is a one-piece injection-molded body having a panel portion, at least one reinforcement member coupled to said panel portion, at least one support member extending from said panel portion, and at least one container extending from said panel portion; and
   wherein said load floor further includes a cover member selectively coupled to said one-piece injection-molded body for covering said at least one container;
   wherein said at least one support member is utilized for supporting said one-piece injection-molded body on the floorpan and minimizing a load span across said panel portion;
   wherein said at least one reinforcement member sufficiently reinforces said panel portion for supporting a predetermined load and minimizing a deflection of said panel portion.

10. The floor assembly recited in claim 9 wherein said load floor is coupled to a rear portion of said floorpan and is substantially aligned with an adjacent floor surface so as to provide a substantially level floor generally from a forward-most seat location to a rearward-most interior location.

* * * * *